United States Patent
Jang

(10) Patent No.: US 11,450,933 B2
(45) Date of Patent: Sep. 20, 2022

(54) TERMINAL FOR A SECONDARY CELL AND A TERMINAL RIVET

(71) Applicant: Northvolt AB, Stockholm (SE)

(72) Inventor: Myungjae Jang, Stockholm (SE)

(73) Assignee: Northvolt AB, Stockholm (SE)

( * ) Notice: Subject to any disclaimer, the term of this patent is extended or adjusted under 35 U.S.C. 154(b) by 0 days.

(21) Appl. No.: 17/457,180

(22) Filed: Dec. 1, 2021

(65) Prior Publication Data

US 2022/0209376 A1    Jun. 30, 2022

(30) Foreign Application Priority Data

Dec. 28, 2020 (EP) .................................. 20217345

(51) Int. Cl.
*H01M 50/557* (2021.01)
*H01M 50/188* (2021.01)
*H01M 50/567* (2021.01)

(52) U.S. Cl.
CPC ....... *H01M 50/557* (2021.01); *H01M 50/188* (2021.01); *H01M 50/567* (2021.01)

(58) Field of Classification Search
None
See application file for complete search history.

(56) References Cited

U.S. PATENT DOCUMENTS

| 2014/0030587 A1* | 1/2014 | Tsuruta | H01M 50/528 |
| | | | 429/179 |
| 2016/0043353 A1 | 2/2016 | Tsutsumi et al. | |
| 2019/0109315 A1* | 4/2019 | Hagino | H01M 50/553 |

FOREIGN PATENT DOCUMENTS

| EP | 2388849 A1 | 11/2011 |
| EP | 2445036 A1 | 4/2012 |
| EP | 2849248 A1 | 3/2015 |
| JP | 2011-243559 A | 12/2011 |
| KR | 10-2013490 B1 | 8/2019 |

OTHER PUBLICATIONS

Extended European Search Report for European Patent Application No. 20217345.6, dated Jun. 7, 2021, (6 pages), European Patent Office, Munich, Germany.

* cited by examiner

*Primary Examiner* — Haixia Zhang
(74) *Attorney, Agent, or Firm* — Alston & Bird LLP

(57) ABSTRACT

This disclosure presents a terminal (30) for a secondary cell (40). The terminal (30) comprises a terminal plate (20) comprising a through-hole (21) and an inner surface (23) adapted to face the interior of the secondary cell (40). The terminal (30) further comprises a terminal rivet (1) that extends through the through-hole (21) of the terminal plate (20). The terminal rivet (1) comprises a first flange (6) that comprises a protruding portion (7), and the protruding portion (7) extends into the inner surface (23) of the terminal plate (20) in a riveted state (1b). The disclosure also presents a terminal rivet (1).

14 Claims, 3 Drawing Sheets

TERMINAL FOR A SECONDARY CELL AND A TERMINAL RIVET

CROSS-REFERENCE TO RELATED APPLICATION(S)

The present disclosure claims priority to and the benefit of European Patent Application No. 20217345.6, filed Dec. 28, 2020, the entire contents of which as are hereby incorporated by reference herein.

TECHNICAL FIELD

The present disclosure generally pertains to a secondary cell for a secondary battery, and more particularly to a terminal for such a cell, which terminal comprises a terminal rivet.

BACKGROUND

In addressing climate change, there is an increasing demand for rechargeable batteries, e.g. to enable electrification of transportation and to supplement renewable energy.

Such batteries typically comprise a number of cells coupled together to provide the desired voltage and current. The cells comprise terminals for electrically contacting the cells. The terminals comprise terminal plates that are electrically contacted to internal components of the cells by terminal rivets. The terminal rivets also serve the purpose of mechanically connecting components of the terminals.

It is generally desirable to provide batteries that do not deteriorate over time, preferably at a low cost. Examples of rechargeable batteries are disclosed in EP2849248A1 and JP2011243559A. These documents disclose rivets with flanges that engage gaskets to hinder electrolyte leakage.

SUMMARY

It is in view of the above considerations and others that the embodiments of the present invention have been made. The present disclosure recognizes the fact that, at least in some scenarios, the service life of secondary cells may be impaired by the selected mechanical design of the cells.

It is a general object of the present disclosure to improve the service life of secondary cells. It is a further object to provide secondary cells that are cost efficient in manufacturing.

It has been realized that when a terminal rivet and a terminal plate are made of metals having different coefficients of thermal expansion, repeated temperature fluctuations may cause impaired mechanical connection and/or impaired electrical contact between the terminal rivet and the terminal plate.

According to a first aspect of the present disclosure, a terminal for a secondary cell is provided. The terminal comprises a terminal plate comprising a through-hole and an inner surface adapted to face the interior of the secondary cell. The terminal further comprises a terminal rivet that extends through the through-hole of the terminal plate, wherein the terminal rivet comprises a first flange that comprises a protruding portion. The protruding portion of the first flange extends into the inner surface of the terminal plate in a riveted state.

Such a terminal allows for ensuring a firm mechanical connection between the terminal rivet and the terminal plate. Also, the electrical contact may be consistent and reliable and the electrical resistance between the terminal rivet and the terminal plate may be low. The terminal also allows use of different materials for the first flange of the terminal rivet and the terminal plate, which materials may have different coefficients of thermal expansion. It should however be appreciated that the terminal of the present disclosure also may be used when the first flange and the terminal plate consist of the same material.

It is believed that a relative variation of sizes of the first flange and the terminal plate, as a result of temperature fluctuations, may even result in a firmer mechanical connection. Another advantage is that other methods of fastening the terminal rivet to the terminal plate, such as welding or soldering, may be omitted.

Since the protruding portion of the first flange extends into the inner surface of the terminal plate in the riveted state, a positive fit may be formed between the protruding portion of the first flange and the terminal plate. As a comparison, a flat flange, i.e. a lacking a protruding portion, abutting against the inner surface of the terminal plate would not form a positive fit but a friction fit.

The terminal of the present disclosure may also be used when the first flange and the terminal plate consist of the same material.

The protruding portion and the terminal plate may be plastically deformed in the riveted state. Thus, the protruding portion and the terminal plate are deformed during riveting. As the protruding portion extends into the terminal plate, the protruding portion and the terminal plate may be hindered from mutual displacement without a further deformation of the protruding portion or the terminal plate.

The protruding portion may be an integral part of the first flange, which may be beneficial for manufacture. The terminal rivet may be rotationally symmetric around a central longitudinal axis.

In the riveted state, which may also be referred to as the deformed state, the protruding portion may be arranged radially outside a portion of the terminal plate with respect to the central longitudinal axis. The protruding portion and the terminal plate may form a radial positive fit. The terminal rivet may be made of a material of equal of higher hardness than the material of the terminal plate. As used herein, "hardness" means the ability of a material to resist deformation during riveting.

The protruding portion may be arranged at a radial distance from the inner circumference of the first flange. The protruding portion may be of a cross-section in the form of an upside down U.

The terminal rivet may comprise a first shaft portion, a second shaft portion and optionally a second flange, which may be configured to abut against a gasket of the terminal. In a variant, the second shaft portion forms the first flange, which may simplify bringing the first flange, including its protruding portion, into the terminal plate during riveting. The second shaft portion may be configured to support the first flange along the longitudinal axis of the terminal rivet, such that the protruding portion may be brought to extend into the terminal plate during riveting. The first shaft portion may extend through the through-hole of the terminal plate.

The first and second shaft portions may be made from the same metal. In a specific example, all load-bearing parts of the terminal rivet may be made from the same metal, or more specifically, the entire terminal rivet may be made from the same metal. The terminal rivet may by one-piece, i.e. consist of one single integral piece of material. Fewer materials and discrete components comprised in the terminal rivet may entail more cost-efficient manufacture. The use of few materials may also provide advantages in recycling.

The first and second shaft portions may be made of copper. All load-bearing components of the terminal rivet may be made of copper. The entire terminal rivet may be made of copper. The terminal plate may be made of aluminium (aluminum in US English). In this connection, copper is to be construed as including copper alloys, i.e. alloys mainly comprising copper. Similarly, aluminium is to be construed as including aluminium alloys.

The protruding portion may be annular in shape. Such a shape may efficiently extend into the terminal plate and form a secure radial positive fit. The annular shape may radially enclose an annular portion of the terminal plate, such that movement in any radial direction is evenly and efficiently hindered. Further, an annular protruding portion may be cost-efficient in manufacture of the terminal rivet, and allows the terminal to be assembled with the terminal rivet in any rotational position.

In an alternative example, the first flange may comprise one single protruding portion only. The protruding portion may extend continuously around the first flange. However, in a further variant the protruding portion may consist of several discrete parts provided on or around the first flange. Such discrete protruding portion may be provided as an annular structure with a number of interruptions along the perimeter of the annular structure.

The protruding portion may be arranged at the radially outer edge of the first flange. Thereby, the protruding portion may be arranged radially outside a relatively large portion of the terminal plate with respect to a central axis of the terminal rivet.

The protruding portion may be in direct contact with the terminal plate. This may be beneficial for the mechanical connection as well as for the electrical contact.

The portion of the terminal rivet that extends through the through-hole of the terminal plate may be deformed in the riveted state to form an axial positive fit with the terminal plate. The portion of the terminal rivet that extends through the through-hole may comprise an internal recess to simplify riveting of the terminal rivet.

In the riveted state, the portion of the terminal rivet that extends through the through-hole of the terminal plate may be deformed such that its outer circumferential surface is inclined radially outwards with respect to the central longitudinal axis of the terminal rivet. The terminal plate may thus be clamped between the outer circumferential surface of the portion of the terminal rivet that extends through the through-hole and the first flange with its protruding portion. This clamping effect is believed to be particularly efficient in ensuring a secure mechanical connection and electrical contact between the terminal rivet and the terminal plate, also after long time use and repeated temperature fluctuations.

According to a second aspect, a secondary cell comprising a terminal as described above is provided.

According to a third aspect, a terminal rivet for a terminal as described above is provided. The terminal rivet comprises a first shaft portion configured to extend through a through-hole of a terminal plate of the terminal and a first flange. The first flange comprises a protruding portion that is configured to extend into the terminal plate in a riveted state.

Such a terminal rivet may comprise the features described above with reference to the terminal. For example, the terminal rivet may comprise a second shaft portion and a second flange that is configured to abut against a gasket of the terminal. The first shaft portion that extends through the through-hole of the terminal plate may be deformed in the riveted state to form an axial positive fit with the terminal plate.

According to a fourth aspect, there is provided a method of fastening a terminal rivet comprising a flange to a terminal plate to form a battery terminal of a secondary cell, wherein the method comprises deforming the first flange and the terminal plate such that the flange extends into the terminal plate. The flange may extend into a second surface of the terminal plate, as has been described above with reference to the terminal.

The method may comprise plastically deforming the first flange and the terminal plate such that a protruding portion of the first flange extends into the terminal plate.

The method may comprise inserting a shaft of the terminal rivet through a through hole of the terminal plate and deforming the shaft to fasten the terminal rivet to a first surface of the terminal plate by means of the deformed shaft.

The terminal rivet may be fastened to the terminal plate solely by the deformation of the terminal plate and the terminal rivet. In other words, the method may exclude additional fastening methods such as welding, soldering or the like.

According to a fifth aspect, there is provided a use of a terminal rivet that comprises a flange for forming a terminal of a secondary cell, wherein the flange extends into the terminal plate in a riveted state.

BRIEF DESCRIPTION OF THE DRAWINGS

The embodiments disclosed herein are illustrated by way of example, and by not by way of limitation, in the figures of the accompanying drawings. Like reference numerals refer to corresponding parts throughout the drawings, in which FIG. 1 schematically illustrates a secondary battery 50 comprising secondary cells 40 and a terminal 30 with a terminal rivet 1.

DETAILED DESCRIPTION

Embodiments of the present disclosure will now be described more fully hereinafter. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art.

Figure 1:
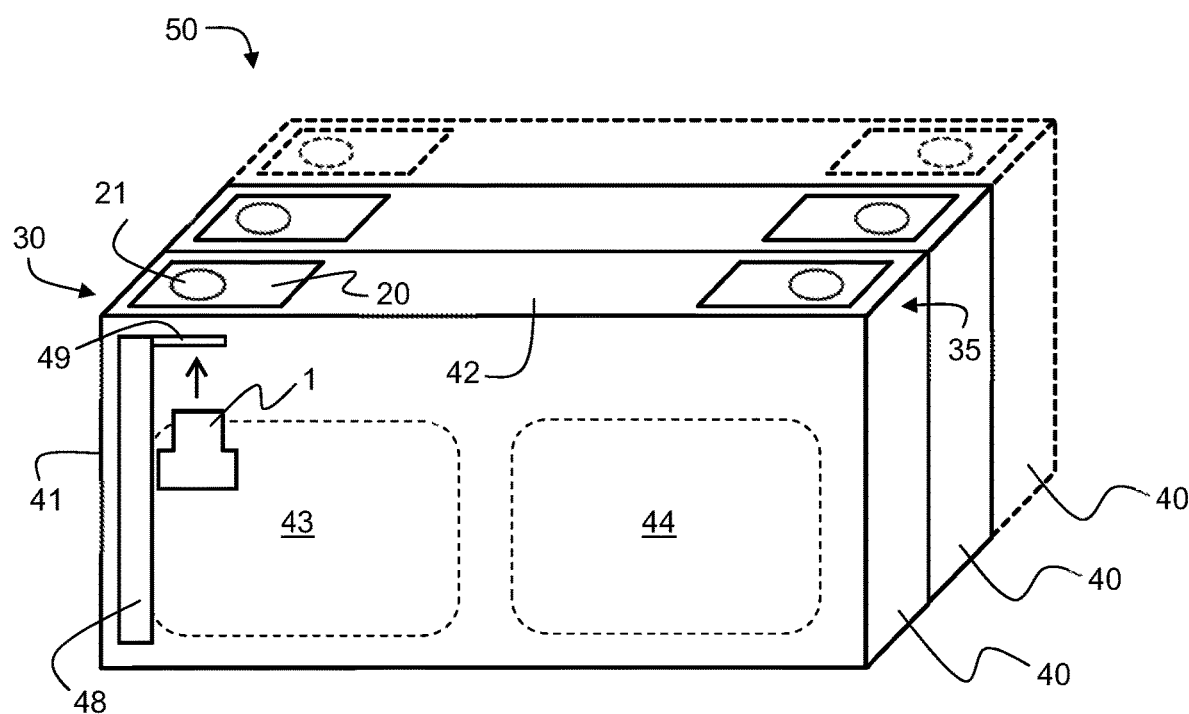

FIG. 1 schematically illustrates a battery 50 that comprises a number of cells 40 arranged adjacent side by side. In FIG. 1, the battery 50 comprises three cells 40, one of which is drawn with dashed lines to illustrate that the battery 50 may comprise a greater number of cells 40. The battery is rechargeable, and the battery as well as the cells are for this reason commonly referred to as a secondary battery and a secondary cell. The battery 50 may be a lithium-ion battery and the cells 40 may thus be lithium-ion cells.

The battery 50 may be configured to propel a fully electric vehicle, such as an electric car or an electric truck. The battery 50 may also be used in a partly electrically propelled vehicle, a so-called hybrid vehicle. Therefore, the battery 50 may be referred to as an EV (Electric Vehicle) battery and the cells 40 may be referred to as EV cells. The battery 50 could also be used as a stationary energy storage connected to a house, to an industrial facility or to grid.

The cells 40 illustrated in FIG. 1 are prismatic (right parallelepipedic) in shape. Each cell 40 comprises a negative (anode) terminal 30 and a positive (cathode) terminal 35 for connection of the cells 40 to each other, and for connection to e.g. an electric motor of a vehicle. In the following, reference will only be made to the negative terminal 30. The positive terminal 35 may be identical to the negative terminal 30, apart from choice of materials as will be described below. The negative terminals 30 may by electrically joined by a bus bar (not shown). Each negative terminal 30, hereinafter terminal 30, comprises a terminal plate 20 with contact elements (not shown) for connection to the bus bar or other connectors.

Each cell 40 comprises a cell can 41 closed by a cell lid 42. The cell can 41 has the form of an upwards open right parallelepipedic box, and the lid 42 is a plate shaped element dimensioned to close the cell can 41.

Each cell 40 contains an anode 43 and a cathode 44 and are filled with an electrolyte, as is known per se. The lid 42 typically comprises a vent (not shown) and a fill opening (not shown) for the electrolyte. The anode 43 and cathode 44 typically comprise respective metal foils (not shown), which are connected to current collectors. In FIG. 1, a current collector 48 at the anode 43 side is schematically illustrated.

Each current collector is connected to a respective terminal plate by a terminal rivet. FIG. 1 schematically illustrates the current collector 48 connected to the anode terminal plate 20 by means of a schematically illustrated terminal rivet 1. The terminal plates may be electrically insulated from the lid 42 by insulating members (not shown).

Figure 2:
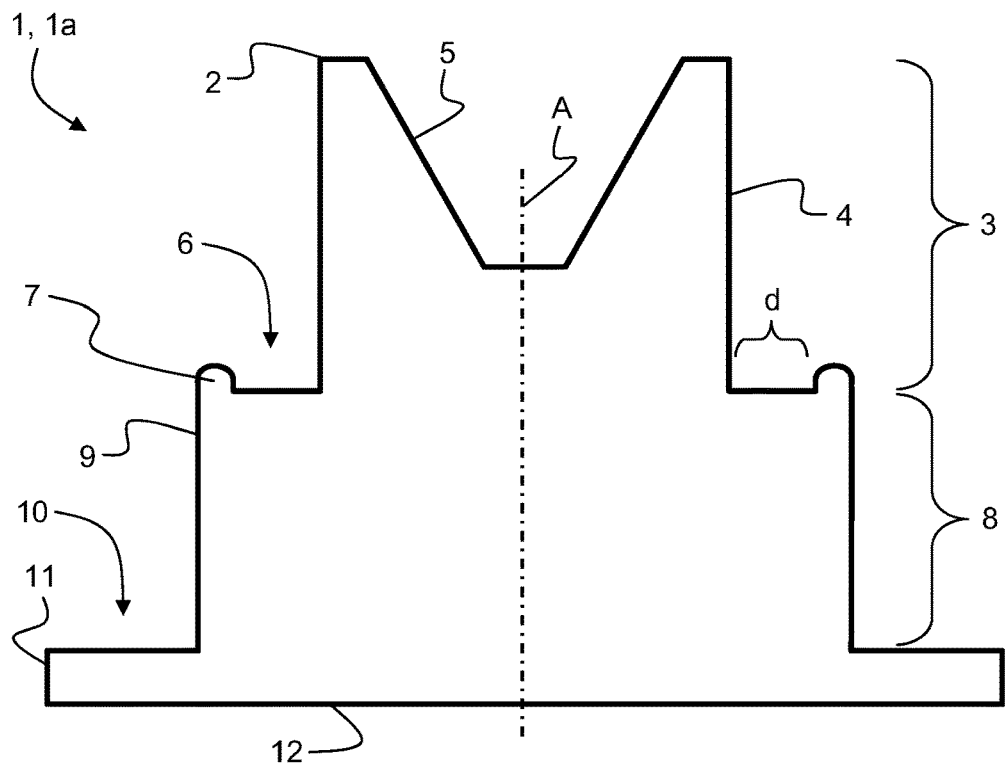
FIG. 2 is an enlarged cross-section showing the terminal rivet 1 of FIG. 1 in an unriveted state.
Figure 3:
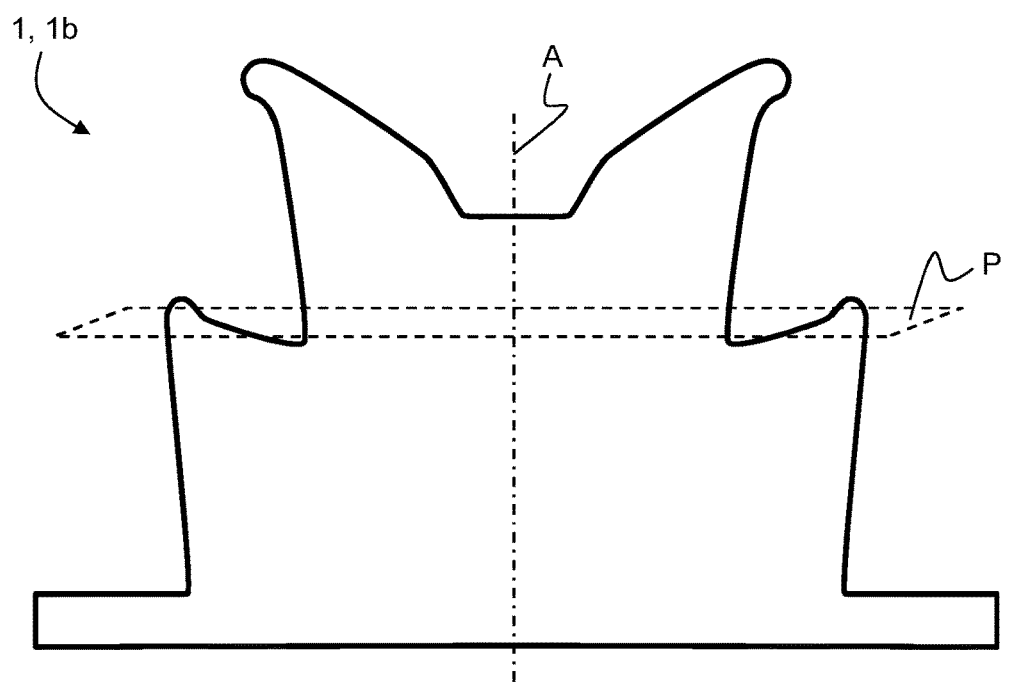
FIG. 3 shows the terminal rivet of FIG. 2 in a riveted state.
Figure 4:
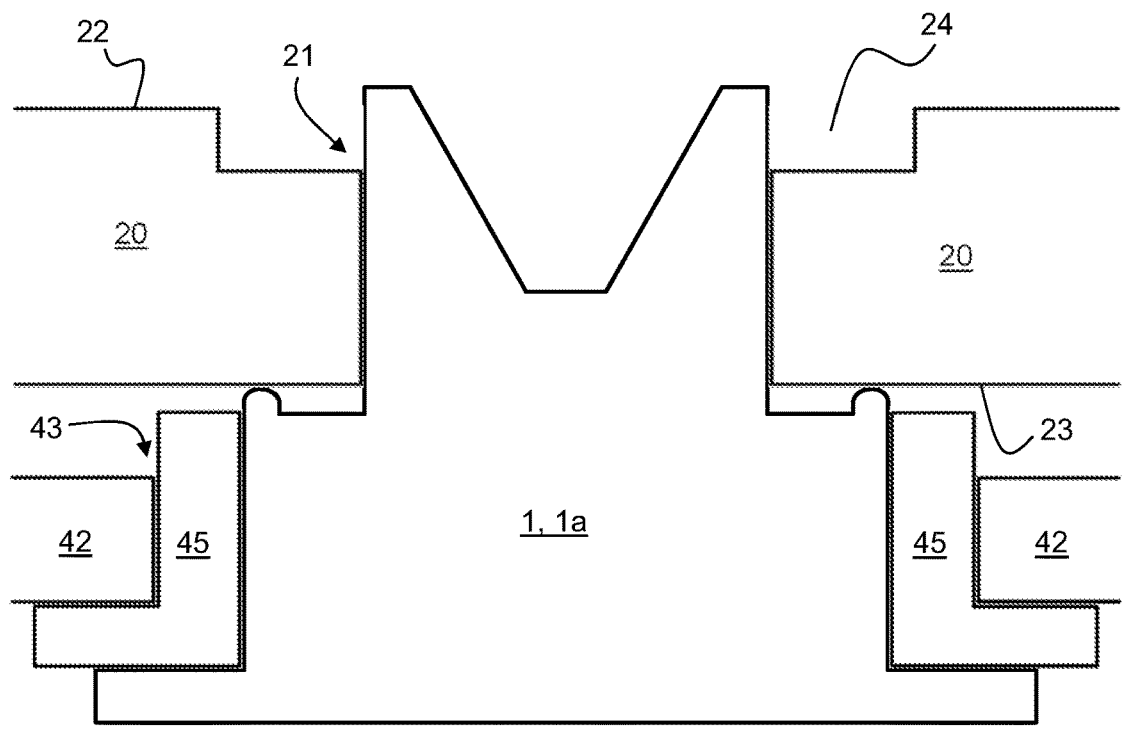
FIG. 4 is an enlarged cross-section through the terminal rivet 1 of FIG. 2 when assembled through a terminal plate 20 and a cell lid 42 with a gasket 45.
Figure 5:
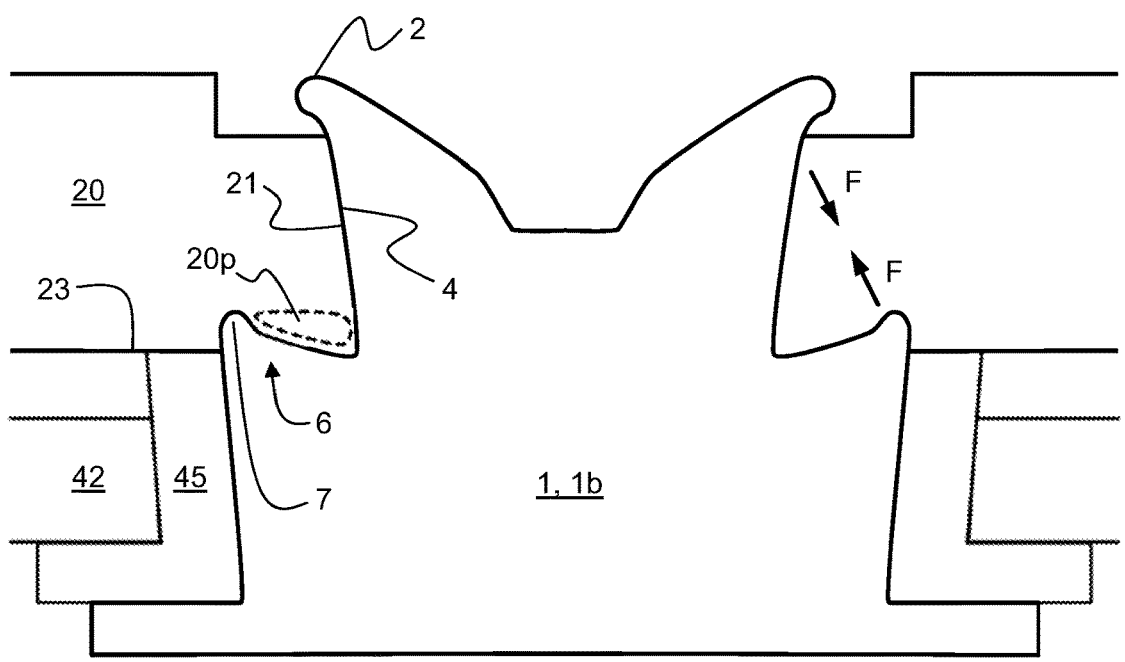
FIG. 5 illustrates the assembled terminal rivet of FIG. 4 in a riveted state.

The terminal rivet 1 of the present disclosure is shown in more detail in FIGS. 2 to 5. An undeformed terminal rivet 1 is shown in FIGS. 2 and 4 and furnished with the additional reference numeral 1a. A deformed, riveted, terminal rivet 1 is shown in FIGS. 3 and 5 and furnished with the additional reference numeral 1b.

FIGS. 4 and 5 show the terminal rivet 1 of the present disclosure together with a portion of the terminal plate 20, a portion of the cell lid 42 and a gasket 45. The terminal rivet 1 extends through a cell lid hole 43 in the cell lid 42. The terminal rivet 1 extends through a terminal plate hole 21 in the terminal plate 20. The terminal rivet 1 has been inserted through the cell lid hole 43 and the terminal plate hole 21 from below in FIGS. 4 and 5 (as is illustrated by the arrow above the terminal rivet in FIG. 1, even though the terminal rivet 1 would in practice not be riveted when the lid 42 is assembled on the can 41). The electrically insulating gasket 45 is arranged between the terminal rivet 1 and the cell lid 42 to electrically insulate the terminal rivet 1 from a cell lid of the cell 40. Further, the gasket 45 seals between the terminal rivet 1 and a cell lid hole 43 such that the electrolyte within the cell 30 will not leak out.

The terminal plate 20 has an outer surface 22, or first surface, that faces away from the cell 40 and an inner surface 23, or second surface, that faces the cell 40, more precisely the interior of the cell 40. Referring to the figures, the outer surface 22 is the upper, flat surface and the inner surface 23 is the lower, flat surface. The outer surface 22 may be referred to as the top surface of the terminal plate 20 and the inner surface 23 may be referred to as the bottom surface of the terminal plate 20. As is clear from e.g. FIGS. 1 and 4 in conjunction, the inner surface 23 extends in parallel with the cell lid 42 when the terminal plate 20 is mounted.

Referring now to FIG. 2, the terminal rivet 1 extends from a first 2 end to a second end 12. The terminal rivet 1 is rotationally symmetric around a central longitudinal axis A. The first end 2 may be referred to as a distal end or outer end, as it extends to the outside of the cell 40 when the cell is assembled. The second end 12 of the terminal rivet 1 may thus be referred to as a proximal end or inner end.

As seen from the first end 2 to the second end 12, the terminal rivet 1 comprises a first shaft portion 3, a first flange 6, a second shaft portion 8, a second flange 10 and a third shaft potion 11. The first shaft portion 3 comprises a first outer circumferential surface 4 and the second shaft portion 8 comprises a second outer circumferential surface 9.

The first shaft portion 3 comprises an internal recess 5 to simplify riveting of the terminal rivet 1. Before riveting, the recess 5 is essentially V-shaped in cross-section. In alternative embodiments, the first shaft portion may comprise a recess of another form, or no recess at all.

The first flange 6 is formed by the distal face of the second shaft portion 8. In this non-limiting example, the second shaft portion 8 is solid. As can be seen, the terminal rivet 1 comprises solid material supporting the first flange 6 through the terminal rivet 1 to the second end 12. The first flange 6 extends radially from the first outer circumferential surface 4 to the second outer circumferential surface 9. The first flange 6 comprises a protruding portion 7.

The first shaft portion 3 may be referred to as a rivet head, the second shaft portion 8 may be referred to as the rivet body and the first flange 6 may be referred to as a rivet shoulder.

FIG. 2 illustrates an annular protruding portion 7 that extends along the radially outer edge of the first flange 6, i.e. at a radial distance d from the inner circumference of the first flange 6. The protruding portion 7 may be referred to as a protrusion or bulge formed on the first flange 6. The protruding portion shown here has a cross-section in the form of an upside down U. In other embodiments, the cross-section may take the form of a semicircle, an upside down V or a rectangle.

Below is described that the protruding portion 7 is to extend into the terminal plate 20 to form a positive fit therewith. It is to be understood that the protruding portion 7 needs not be annular or have a continuous extension around the first flange 6 to form a positive fit with the terminal plate 20. For example, there may instead be provided a number of discrete protruding portions 7 on the first flange 6.

As is clear from FIGS. 2 and 4 in conjunction, the first shaft portion 3 extends through the terminal plate 20. The first shaft portion 3, and thus the outer end of the terminal rivet 1, protrudes over the outer surface 22. The first flange 6 abuts against the terminal plate 20. The second shaft portion 8 extends through the cell lid 42 and the gasket 45. The second flange 10 abuts against the gasket 45. More precisely the second flange 10 abuts against a gasket flange, as described below. The first flange 6 is hereinafter referred to as the terminal flange.

In the present embodiment, the longitudinal length (along axis A) of the terminal rivet 1 is less than the largest diameter (the width of the third shaft potion 11) of the terminal rivet. The longitudinal length of the terminal rivet 1 is approximately 60 to 70 percent of its largest diameter. The longitudinal length of the terminal rivet 1 essentially equals the diameter of the second shaft portion 8. The longitudinal length of the first shaft portion 3 is essentially equal to the longitudinal length of the second shaft portion 8.

Further, the diameter of the first shaft portion 3 is approximately 60 to 65 percent of the diameter of the second shaft portion 8. The outer diameter of the terminal flange 6 equals the diameter of the second shaft portion 8. The diameter of the second shaft portion 8 is approximately 55 to 65 percent of the outer diameter of the second flange 10. The radial extension of the terminal flange 6 is essentially equal to the radial extension of the second flange 10 and is approximately 55 to 65 percent of the radius of the first shaft portion 3.

The gasket 45 comprises a hollow cylindrical portion of approximately the same longitudinal length (along axis A) as the second shaft portion 8. The hollow cylindrical portion has a diameter selected to snugly fit around the second shaft portion 8. The gasket further comprises a gasket flange that extends radially from the inner end of the hollow cylindrical portion.

As has been described above with reference to FIG. 1, the terminal rivet 1 electrically contacts the current collector 48 to the anode terminal plate 10. This may be accomplished by a rivet connector (not shown) arranged on the portion of the terminal rivet 1 that is positioned in the cell 40 is configured to make contact with a coupling portion 49 (schematically illustrated in FIG. 1) of the current collector 48.

The riveting of the terminal rivet 1 may be performed by punching in a manner known per se. One end of the terminal rivet 1 may rest against an anvil while the other end is punched by a mandrel. For example, the outer end 2 of the terminal rivet 1 may rest on an anvil while the inner end 12 is punched by a mandrel.

Turning now to FIG. 5, it can be seen that in the riveted state of the terminal rivet 1, 1b, the terminal plate 20 is axially held, or clamped, by the outer end 2 of the terminal rivet 1, 1b together with the terminal flange 6. More precisely, the terminal plate 20 is axially held by the first shaft portion 3 and the terminal flange 6.

During riveting, the originally (FIGS. 2 and 4) V-shaped recess 5 at the outer end 2 (within the first shaft portion 3) is flattened out. The first shaft portion 3 is deformed such that its outer circumferential surface 4 is inclined radially outwards with respect to the terminal rivet axis A.

In other words, along the extension of the first shaft portion 3 from the terminal flange 6 to the outer end 2 of the terminal rivet 1, 1b, the radius of the first shaft portion 3 continuously increases. The terminal plate hole 21 has been deformed correspondingly and its inner wall is in firm contact with the first outer circumferential surface 4 to form an axial positive fit. The increasing radius of the first shaft portion 3 stops the terminal rivet 1 from displacement in the direction of insertion (downwards in FIG. 5). Thus, the portion, more precisely the first shaft portion 3, of the terminal rivet 1 that extends through the terminal plate hole 21 has been be deformed in the riveted state to form an axial positive fit with the terminal plate 20.

The terminal flange 6 extends into the terminal plate 20. More precisely, in the riveted state, the protruding portion 7 of the terminal flange 6 extends into the terminal plate 20, more precisely into the inner surface 23 thereof. Thus, the protruding portion 7 is arranged radially outside that portion 20p (illustrated in FIG. 5) of the inner surface 23 that forms the inner end of the terminal plate hole 21, as seen in a plane P (illustrated in FIG. 3) that is normal to the axis A.

Put in other words, the terminal rivet occupies an original volume in the non-riveted state 1a shown in FIG. 4. Similarly, the terminal plate 20 has an original volume. The terminal rivet 1b as well as the terminal plate 20 then occupies respective deformed volumes in the riveted state, shown in FIG. 5. In the riveted state, the protruding portion 7 of the terminal rivet 1b extends into the original volume of the terminal plate 20. Thus, the protruding portion 7 has made a dent or a depression in the terminal plate 20, and the protruding portion 7 is positioned in this dent or depression.

When the protruding portion 7 extends into the terminal plate 20, the protruding portion 7 cannot move with respect to the terminal plate 20 in the radial direction without deforming the protruding portion 7 or the terminal plate 20. In other words, the protruding portion 7 forms a positive fit, more precisely a radial positive fit, with the terminal plate 20 in the riveted state. This is particular beneficial should the material of the terminal rivet 1 and the terminal plate 20 have different coefficients of thermal expansion, as is described below.

Thus, the terminal plate is clamped between the first outer circumferential surface 4 and the terminal flange 6 with the protruding portion 7. The positive fit of the protruding portion 7 is efficient in obtaining the clamping effect. The clamping forces F are schematically illustrated by the arrows on the right hand side of the terminal rivet 1 in FIG. 5.

Typically, the cathode 44 of a secondary cell 40 comprises aluminium foil. As it may be advantageous to use the same metal throughout a current path, especially within a battery containing an electrolyte, at the cathode side also the current collector including its coupling portion and the terminal rivet may comprise, or consist of, aluminium. The anode 43 of a secondary cell 40 typically comprises copper foil. At the anode side the current collector 48 including its coupling portion 49 and the terminal rivet 1 may comprise, or consist of, copper.

It is generally desirable to use the same metal for both terminal plates, i.e. at the anode side and at the cathode side, of a secondary cell 40. Thus, as follows from the above paragraph, at one side there will be different materials used for the terminal rivet and the terminal plate.

The terminal plates advantageously consist of aluminium. Therefore, at the anode side the terminal rivet 1 is made of copper (or a copper alloy) whereas the terminal plate 20 is made of aluminium (or an aluminium alloy). During use, the secondary cell 40 will be subject to temperature fluctuations as a result of charging, discharging and also because of varying ambient temperatures. Aluminium and copper have different coefficients of thermal expansion.

It has been realized that when a terminal rivet and a terminal plate are made of metals having different coefficients of thermal expansion, temperature fluctuations may cause impaired mechanical connection and/or electrical contact between the terminal rivet and the terminal plate. The present terminal rivet ensures secure mechanical connection and electrical contact between the terminal rivet and the terminal plate, also after long time use and repeated temperature fluctuations.

As is clear from FIG. 5, the interface between the aluminium terminal plate 20 and the copper terminal rivet 1 is outside the cell lid 42. Thus, the electrolyte within the cell 40 will not come into contact with the aluminium-copper interface.

In the present embodiment, the outer surface 22 comprises an optional cutout 24 for accommodating the flattened out recess 5, or more precisely the deformed portion of the terminal rivet 1b that extends from the outer surface 22. The cutout is annular and surrounds the terminal plate hole 21 at the outer surface 22. In other terms, the terminal plate hole 21 is a recessed hole.

Modifications and other variants of the described embodiments will come to mind to one skilled in the art having benefit of the teachings presented in the foregoing description and associated drawings. Therefore, it is to be understood that the embodiments are not limited to the specific example embodiments, including the relative dimension of the terminal rivet 1, described in this disclosure and that modifications and other variants are intended to be included within the scope of this disclosure.

The present disclosure is mainly concerned with mechanically connecting and electrically contacting the terminal rivet 1 and the terminal plate 20. Thus, as is to be apprehended, the second flange 10 of the above embodiments is optional. In terminals that comprise a gasket 45 as described above, there may exist other solutions for keeping the gasket 45 in place.

Furthermore, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims (or embodiments), these may possibly advantageously be combined, and the inclusion of different claims (or embodiments) does not imply that a certain combination of features is not feasible and/or advantageous. In addition, singular references do not exclude a plurality. Finally, reference numerals in the claims are provided merely as a clarifying example and should not be construed as limiting the scope of the claims in any way.

The invention claimed is:

1. A terminal for a secondary cell, the terminal comprising:
   a terminal plate comprising a through-hole and an inner surface adapted to face the interior of the secondary cell, and
   a terminal rivet that extends through the through-hole of the terminal plate, wherein the terminal rivet comprises
   a first flange that comprises a protruding portion extending a distance above a remaining surface portion of the first flange,
   wherein the protruding portion of the first flange extends into the inner surface of the terminal plate in a riveted state.

2. The terminal of claim 1, wherein the protruding portion and the terminal plate are plastically deformed in the riveted state.

3. The terminal of claim 2, wherein, in the riveted state, the protruding portion is arranged radially outside a portion of the terminal plate with respect to a central axis of the terminal rivet.

4. The terminal of claim 2, wherein the protruding portion is arranged at a radial distance from the inner circumference of the first flange.

5. The terminal of claim 4, wherein the terminal rivet comprises a first shaft portion that extends through the through-hole of the terminal plate and a second shaft portion that forms the first flange.

6. The terminal of claim 5, wherein:
   the terminal comprises a gasket through which the second shaft portion extends, wherein the gasket is configured to electrically insulate the terminal rivet from a cell lid of the secondary cell, and
   the terminal rivet further comprises a second flange that is configured to abut against the gasket.

7. The terminal of claim 5, wherein the first and second shaft portions are made from the same metal.

8. The terminal of claim 7, wherein the first and second shaft portions are made of copper or a copper alloy and the terminal plate is made of aluminium or an aluminium alloy.

9. The terminal of claim 1, wherein the terminal is an anode terminal.

10. The terminal of claim 1, wherein the protruding portion is annular in shape.

11. The terminal of claim 10, wherein the protruding portion consists of several discrete parts.

12. The terminal of claim 10, wherein the protruding portion is arranged at a radially outer edge of the first flange.

13. The terminal of claim 1, wherein the protruding portion is in direct contact with the terminal plate.

14. A secondary cell comprising a terminal of claim 1.

* * * * *